United States Patent [19]

Nakashima et al.

[11] Patent Number: 5,389,587
[45] Date of Patent: Feb. 14, 1995

[54] BN-GROUP CERAMICS HAVING EXCELLENT RESISTANCE TO LOSS BY DISSOLVING

[75] Inventors: Masazumi Nakashima; Sumihiko Kurita, both of Saga, Japan

[73] Assignee: Kabushiki Kaisha Kouransha, Saga, Japan

[21] Appl. No.: 5,409

[22] Filed: Jan. 19, 1993

Related U.S. Application Data

[63] Continuation of Ser. No. 499,419, filed as PCT/JP89/01151, Nov. 10, 1989, published as WO90/05122, May 17, 1990, abandoned.

[30] Foreign Application Priority Data

Nov. 10, 1988 [JP] Japan .................. 63-284868

[51] Int. Cl.$^6$ .................................. C04B 35/58
[52] U.S. Cl. ........................ 501/96; 501/97; 501/98
[58] Field of Search .............. 501/96, 98, 97; 423/290, 409, 412

[56] References Cited

U.S. PATENT DOCUMENTS 4,539,300  9/1985  Coblenz ..................... 501/96

FOREIGN PATENT DOCUMENTS

| | | | |
|---|---|---|---|
| 131884 | 1/1985 | European Pat. Off. | 501/96 |
| 58-176173 | 10/1983 | Japan | 501/96 |
| 61-038152 | 8/1986 | Japan . | |
| 63-002858 | 1/1988 | Japan . | |
| 1131066 | 5/1989 | Japan . | |
| 1252584 | 10/1989 | Japan . | |
| 742324 | 12/1955 | United Kingdom | 501/96 |
| 530018 | 9/1976 | U.S.S.R. | 501/96 |
| 979301 | 12/1982 | U.S.S.R. | 501/96 |

*Primary Examiner*—Anthony Green
*Attorney, Agent, or Firm*—Nikaido, Marmelstein, Murray & Oram

[57] ABSTRACT h-BN-group ceramics having excellent dissolving-loss proofness against hot melt of metal, glass and the like. If 50% or more of h-BN and 1-less than 50% of complex compound consisting of two or more kinds of compounds selected from the group of (AlN, $Si_3N_4$, $Al_2O_3$ and $SiO_2$) are contained in a sintered body, then dissolving-loss proofness against hot melt is remarkably improved. Furthermore, besides the aforementioned complex compound, if less than 30% of one kind or two or more kinds compounds selected from the group (AlN, $Si_3N_4$, $Al_2O_3$ and $SiO_2$) is contained, then in addition to the dissolving-loss proofness, unwettability and thermal shock proofness are extremely improved.

15 Claims, 5 Drawing Sheets

BN-GROUP CERAMICS HAVING EXCELLENT RESISTANCE TO LOSS BY DISSOLVING

This application is a continuation of application Ser. No. 07/499,419, filed as PCT/JP90/01151, Nov. 10, 1989, published as WO90/05122, May 17, 1990, now abandoned.

TECHNICAL FIELD

The present invention relates to BN-group ceramics having excellent resistance to loss by dissolving in a hot melt of metal, glass or the like.

Background of the Invention

Although h-BN ceramics have excellent unwettability against hot melt of metal, glass and the like, they are not usually used for hot melt. Because they are produced normally through a hot-press method, they are hardly sinterable materials; hence they are very expensive.

Another reason why h-BN ceramics made by the hot press method are not usually used with a hot melt is that in the hot press method, $_2O_3$ group glass, which is relatively easily wettable with h-BN ceramics is use as a binder. Against a hot melt, the binder softens and dissolves out to the surface of the h-BN ceramic causing a degradation of high temperature mechanical strength and loss by dissolving.

Recently, no-pressure or reactant sintered complexes principally consisting of ceramics other than BN component such as $Si_3N_4$-h-BN not containing $B_2O_3$-group glass or the like, have been known but these do not have the excellent properties such as etc. which are inherently possessed by h-BN. These are materials have the property that at best thermal-shock proofness can be slightly improved by making them contain a small amount of BN component, and it is the present status that they cannot be utilized as members for use with general hot melt.

Accordingly, in order to make BN ceramics that can be used with hot melt while preserving the excellent various properties of the BN ceramics, development of heretofore not known new materials which essentially contain h-BN component as a principal component and reveal excellent properties in dissolving-loss proofness, unwettability and thermal-shock proofness, is necessary.

Disclosure of the Invention

The present invention has been worked out in view of the above-mentioned problems in the technique at present, and one object of the invention is to provide less expensive h-BN-group ceramic materials which have excellent resistance to loss by dissolving against hot melt of metal, glass and the like, and moreover can be produced through a no-pressure sintering method.

As a result of earnest investigations on the aforementioned problems conducted by the inventor of this invention, it was discovered:

(1) that if a sintered body is made to contain 50% or more of h-BN and from 1% to less than 50% of a complex compound consisting of two or more compounds selected from the group consisting of AlN, $Si_3N_4$, $Al_2O_3$ and $SiO_2$, resistance to loss by dissolving against hot melt of metal, glass and the like is remarkably improved;

(2) that if a sintered body is made to contain 50% or more of h-BN and less than 30% of a complex compound consisting of two or more compounds selected from the group consisting of AlN, $Si_3N_4$, $Al_2O_3$ and $SiO_2$, mechanical strength is remarkably improved while preserving the resistance to loss by dissolving; and (3) that especially is $Al_6Si_2O_{13}$, $Si_2Al_3O_7N$, $Si_3Al_{2.67}N_4O_4$, $Si_3Al_3O_3N_5$, $Al_3O_3N$ or $Si_6Al_{10}O_{21}N_4$ is contained as the aforementioned complex compound, then besides the resistance to loss by dissolving, the inherent properties (unwettability) and thermal-shock proofness) possessed by BN are extremely improved.

The present invention has been worked out on the basis of the above-described knowledge.

The reason why the h-BN content is chosen to be 50% or more according to the present invention, is because if it is less than 50%, then the other ceramic components would exceed 50%, and the properties of these ceramic components would predominate. The properties inherently possessed by h-BN, especially resistance to dissolving-loss and thermal-shock would become faint. Accordingly, it is necessary that the upper limit value of the complex compound consisting of two or more kinds of compounds selected from the group consisting of AlN, $Si_3N_4$, $Al_2O_3$ and $SiO_2$ as a ceramic component other than h-BN should be naturally less than 50%. The reason why the lower limit of the aforementioned complex compound is defined to be 1%, is because if it is less than 1%, the ceramic does not have sufficient resistance to loss by dissolving against hot melt of metal, glass and the like.

While BN ceramics are inherently excellent in thermal-shock proofness, the thermal shock proofness raises depending upon the contents of ceramic components other than h-BN. If the h-BN content is 50% or more, that is, if the content of ceramic components other than h-BN is less than 50%, then in almost every case the ceramics can be adapted as a member for use with hot melt without any inconvenience, but in the event that the ceramics are used as special application member, that is, hot melt is at least partly solidified and the ceramics are used as a member in the solidified region (for instance, as a joint section between a feed nozzle and a Cu-mold in a horizontal continuous casting machine, a ceramic mold, a lining member of a Cu-mold, a withdrawing nozzle for shaping glass, or the like), preferable h-BN should be 70% or more and components other than h-BN should be from 1% to less than 30%. More preferably h-BN should be from 70% to 90% and components other than h-BN should be from 3 to 30%.

The reason why complex compound consisting of two or more kinds of compounds selected from the group consisting of AlN, $Si_3N_4$, $Al_2O_3$ and $SiO_2$ is chosen as a ceramic component other than h-BN, is because the produced ceramics present very excellent thermal-shock proofness and unwettability which were not found in the heretofore known h-BN complex, in addition to their excellent dissolving-loss proofness. Especially good results are obtained when the composition of the complex compound is $Al_6Si_2O_{13}$, $Si_2Al_3O_7N$, $Si_3Al_{2.67}N_4O_4$, $Si_3Al_3O_3N_5$, $Al_3O_3N$ or $Si_6Al_{10}O_{21}N_4$, for instance, $3Al_2O_3 \cdot 2SiO_2$, $2SiO_2 \cdot AlN \cdot Al_2O_3$, $2SiO_2 \cdot 2.67AlN \cdot 1/3Si_3N_4$, $AlN \cdot Si_3N_4 \cdot Al_2O_3$, $Al_2O_3 \cdot AlN$ or $6SiO_2 \cdot 3Al_2O_3 \cdot 4AlN$.

These complex compounds can be adapted through any manufacturing process so long as they are present in the sintered h-BN-group ceramics within the above-mentioned range. For instance, either individual components of the complex compound composition could be contained in the starting material and then sintered or the above-mentioned complex compound could be produced during the sintering process.

The reason why AlN, $Si_3N_4$, $Al_2O_3$ and $SiO_2$ were chosen as components other than complex component is because even if these are contained in BN as a singular component, excellent corrosion resistivity is revealed, and because depending upon a method of manufacture they are contained as inevitable impurities of the complex compound contents in h-BN.

BEST MODES FOR EMBODYING THE INVENTION

Preferred Embodiment 1.

Samples Nos. 1–8 were prepared by sintering at an ordinary pressure at 1,500° C.–1,800° C. within $N_2$ atmosphere then after being molded into a rod shape by means of a rubber-press, and then machining the sample into pieces of 10 mm in diameter and 70 mm in length.

The sinter phases of these samples were investigated through X-ray diffraction. Resistance to dissolving loss was measured by the following method: in a steel melt (JIS SUS-304) molten at 1,500° C.–1,550° C. by means of a high-frequency melting furnace, was added Al in the amount of 0.02%. Sample Nos. 1–8 were dipped therein and held for 0.5 hr. while being rotated at a speed of 60 rpm, and the amounts of dissolving-loss were measured.

The results are indicated in Table 1.

TABLE 1

Composition (%) and Amount of Dissolving-Loss of Used Ceramics

| No | BN Component % | Complex Compound Composition | | Another Component | | Diameter After Dipping mm |
|---|---|---|---|---|---|---|
| 1 | 95 | $Al_6Si_2O_{13}$ | 5 | | 0 | 9.1 |
| 2 | 70 | $Al_6Si_2O_{13}$ | 30 | | 0 | 9.5 |
| 3 | 60 | $Al_6Si_2O_{13}$ | 30 | $SiO_2$ | 10 | 9.0 |
| 4 | 70 | $Si_2Al_3O_7N$ | 15 | | | |
| | | $Al_6Si_2O_{13}$ | 15 | | 0 | 10.0 |
| 5 | 70 | $Si_2Al_3O_7N$ | 30 | | 0 | 10.0 |
| 6 | 70 | $Si_2Al_3O_7N$ | 15 | | | |
| | | $Si_2Al_3O_7N_5$ | 15 | | 0 | 9.9 |
| 7 | 70 | $Si_2Al_3O_7N$ | | | | |
| | | $Si_3Al_{2.67}N_4O_4$ | 15 | | 0 | 10.0 |
| 8 | 70 | $Si_2Al_3O_7N$ | 15 | AlN | 15 | 10.0 |

The sinter components of Samples Nos 1–8 are composed of h-BN, a complex compound consisting of two or more kinds of compounds selected from the group consisting of AlN, $Si_3N_4$, $Al_2O_3$ and $SiO_2$ an another compound selected from the group consisting of AlN, $Si_3N_4$, $Al_2O_3$ and $SiO_2$, and for every sample, the diameter after dipping was nearly the same as the diameter of 10 mm before dipping, and the resistance to loss by dissolving was very excellent.

Preferred Embodiment 2.

Samples Nos. 9–14 were prepared by sintering at an ordinary pressure at 1,800° C. within $N_2$ atmosphere after being molded into a square rod shape by means of a rubber press, and then machining the sample into pieces of 25 mm square and 220 mm in length. The sinter phases of these samples were investigated through X-ray diffraction.

Also, the resistance to dissolving loss was prepared by the following method: into a steel melt (JIS SCR-420) molten at 1,550°–1568° C. by means of a high-frequency melting furnace, was added Al by 0.053%. Samples Nos. 9–14 were dipped therein and held for 3 hr. while being rotated at a speed of 0.33 rps., and the amounts of dissolving-loss were measured.

The results are indicated in Table 2.

With regard to Samples Nos. 9–13, in every case dissolving-loss after dipping was not observed, and the samples were very excellent in resistance to loss by dissolving. In addition, Sample No. 14 was broken due to thermal stress during the test.

TABLE 2

Compositions (%) and Amount of Dissolving-Loss of Used Ceramics

| No | BN Component % | Complex Compound Component and Another Component | % | Size After Dipping mm |
|---|---|---|---|---|
| 9 | 70 | $Al_6Si_2O_{13}$ | | |
| | | $Si_6Al_{10}O_{21}N_4$ | 30 | 25 |
| 10 | 70 | $Si_3Al_3O_3N_5$ | | |
| | | $Si_6Al_{10}O_{21}N_4$ | 30 | 25 |
| 11 | 70 | $Al_3O_3N$, AlN | 30 | 25 |
| 12 | 60 | $Al_3O_3N$, AlN | 40 | 25 |
| 13 | 50 | $Al_3O_3N$, AlN | 50 | 25 |
| 14 | 30 | $Al_3O_3N$, AlN | 70 | — |

Preferred Embodiment 3.

After the Samples having the composition of samples Nos. 9–14 in the second preferred embodiment had been molded into a pipe shape by means of a rubber press, they were sintered at an ordinary pressure at 1,800° C. within $N_2$ atmosphere, and then they were machined into a piece of 50 mm in inner diameter, 60 mm in outer diameter and 50 mm in length.

Figure 1:
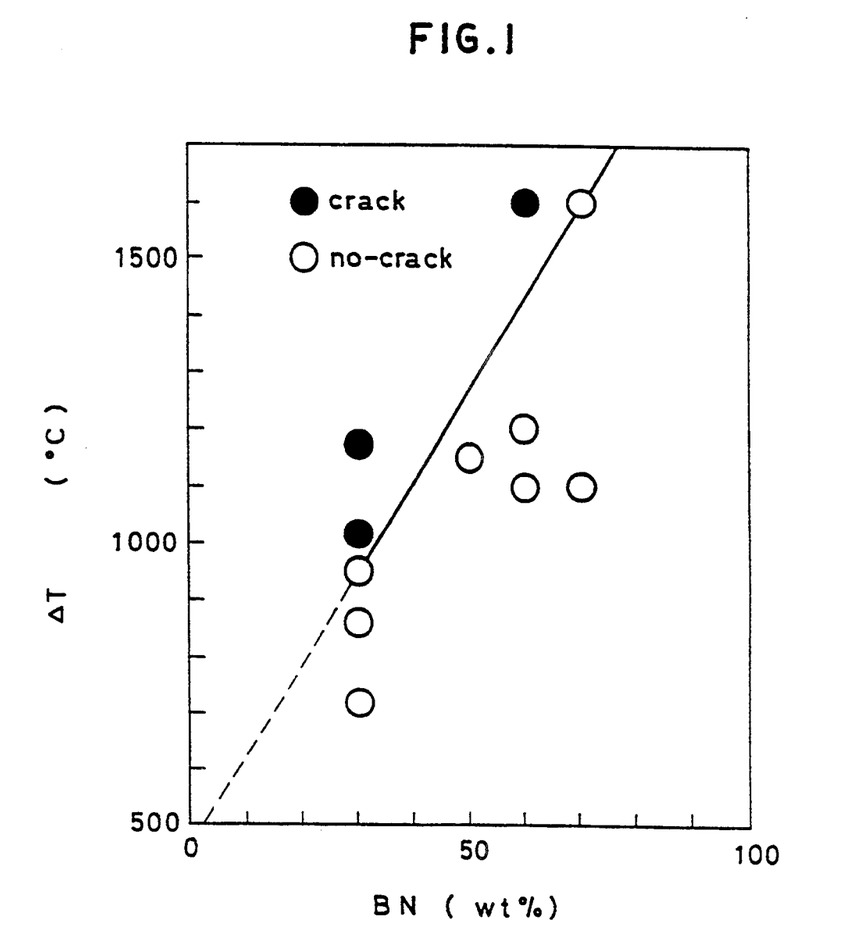
FIG. 1 is a diagram of the relation between thermal-shock resistivity $\Delta T$ and BN content.

These samples were preheated for 30 minutes at a room temperature or at a predetermined temperature not exceeding 900° C., and then dipped in steel melt at 1,600° C. for one minute, and resistance to thermal-shock was investigated. The results are indicated in FIG. 1.

At a h-BN content of 50%, $\Delta T$ was as high as about 1,300° C. That and at 70% $\Delta T$ was 1,600° C., that is even if they were to be directly dipped into steel melt at 1,600° C. from a room temperature, they were not broken.

If the h-BN content is 50% or more, resistance to thermal shock that is inherently possessed by h-BN is not deteriorated, and also if the sintered product is 70% or more, it can be used as a member to be placed at a location where hot melt would solidify at least partly.

Preferred Embodiment 4.

Samples Nos. 15–19 were sintered at an ordinary pressure at 1,800° C. within $N_2$ atmosphere, after being molded into a crucible shape by means of a rubber press.

Then they were machined into a crucible having an inner diameter of 10 mm and a thickness of about 5 mm.

The sinter layer was investigated by X-ray diffraction, and corrosion resistivity was investigated by melting metal (JIS SUS-304) in the produced crucible under the condition of holding for one hour at 1,550° C. within Ar atmosphere. The results are indicated in Table 3.

TABLE 3

Composition (%) and State of Dissolving-Loss of Used Ceramics

| No | BN Component % | Complex Compound Component and Another Component | % | State of Dissolving-Loss | Thermal Exp. Coef. RT-700°C×$10_{31\ 6}$ 1/°C. |
|---|---|---|---|---|---|
| 15 | 70 | $Al_3O_3N$, AlN | 30 | ⊙ | 4 |
| 16 | 70 | $Al_3O_3N$, $Si_3Si_3Al_3O_3N_5$ | 30 | ⊙ | 3–4 |
| 17 | 70 | $Si_6Al_{10}O_{21}N_5$, $Si_3Al_3O_3N_5$ | 30 | ⊙ | 1–2 |
| 18 | 70 | $Si_3Al_{10}O_{21}N_4$, $Si_2Al_6O_{13}$ | 30 | ⊙ | 0–1 |
| 19 | 70 | $Si_2Al_6O_{13}$ | 30 | ○ | 0–1 |

⊙ Better
○ Good

Figure 2:
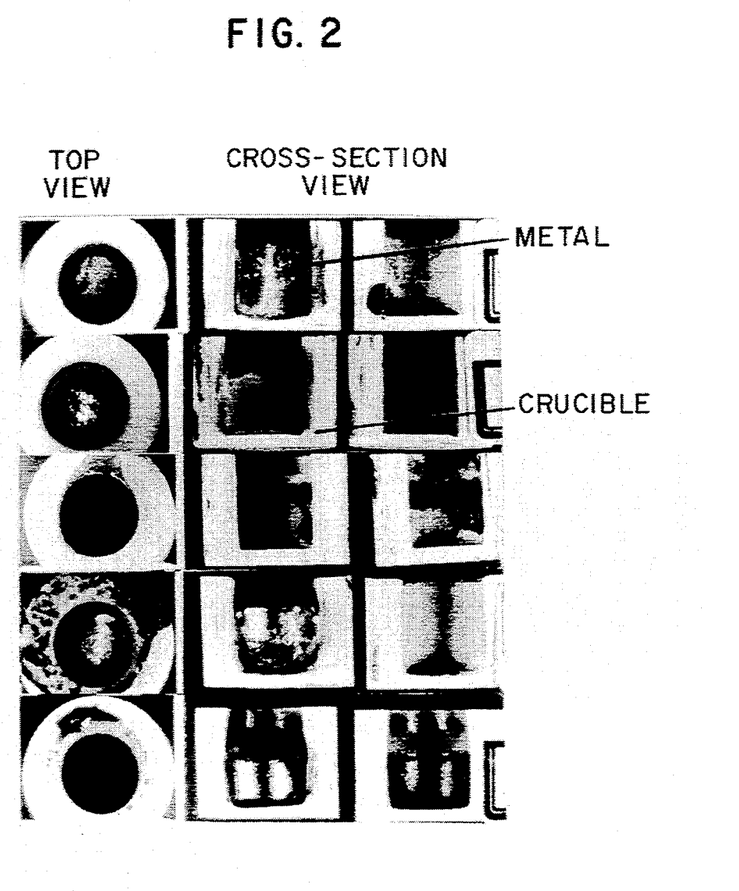
FIG. 2 shows evaluation photographs for corrosion resistivity consisting of photographs of a top surface and photographs of a cross-section after crucible melting tests.

The state of dissolving-loss in Table 3 is shown by photographs in FIG. 2.

If the resistance to loss by dissolving were poor, the crucible inner surface held in contact with the metal would be remarkably enlarged, or holes would be opened in the crucible wall.

Every one of Samples Nos. 15–19 was excellent in resistance to loss by dissolving.

Preferred Embodiment 5.

The samples Nos. 15–19 in Table 3 were adapted as a withdrawing nozzle for use in shaping of glass.

Figure 3:
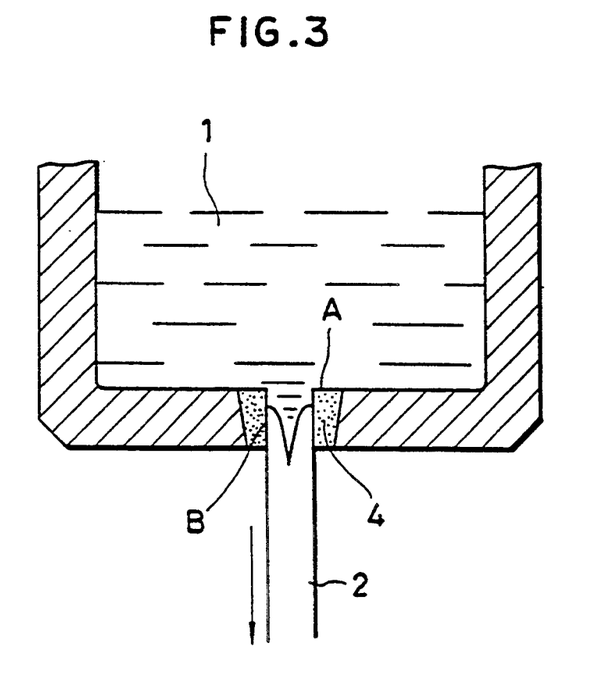
FIGS. 3, 4, 5 and 6 are schematic views for explaining application to members to be placed at a location where hot melt solidifies at least partly.

A schematic view of glass shaping is shown in FIG. 3, and in the following description will made with reference to FIG. 3.

Hot melt 1 commences to solidify from the inside of a nozzle (location B in the figure), and a solidified body 2 is withdrawn as being shaped into the nozzle inner surface configuration (in the direction of an arrow in the figure). Accordingly, the nozzle inner surface (location B in the figure) has a temperature lower than the solidifying temperature. On the other hand, a nozzle 4 is also partly held in contact with the hot melt 1, too, at location A in the figure, and the location A has a temperature higher than the inner surface B. In other words, the nozzle 4 is held in contact with two phases of a hot melt phase and a solidified phase, and a large temperature difference arises within the nozzle. Consequently, in addition to the resistance to loss by dissolving the nozzle material must be excellent in resistance to thermal shock and thermal stress.

Sinters having the composition of Samples Nos. 15–19 were shaped as nozzles having an inner diameter of 17.5 mm, an outer diameter of 27 mm and a length of 20 mm were produced. $SO_2$ group glass was used as the hot melt, and when hot melt glass was withdrawn at a temperature of about 1,400° C., a glass shaped body having no crack and being excellent in quality was obtained.

Preferred Embodiment 6.

Samples having the composition of samples Nos. 18 and 19 were shaped as brake ring in a horizontal continuous casting machine.

Figure 4:
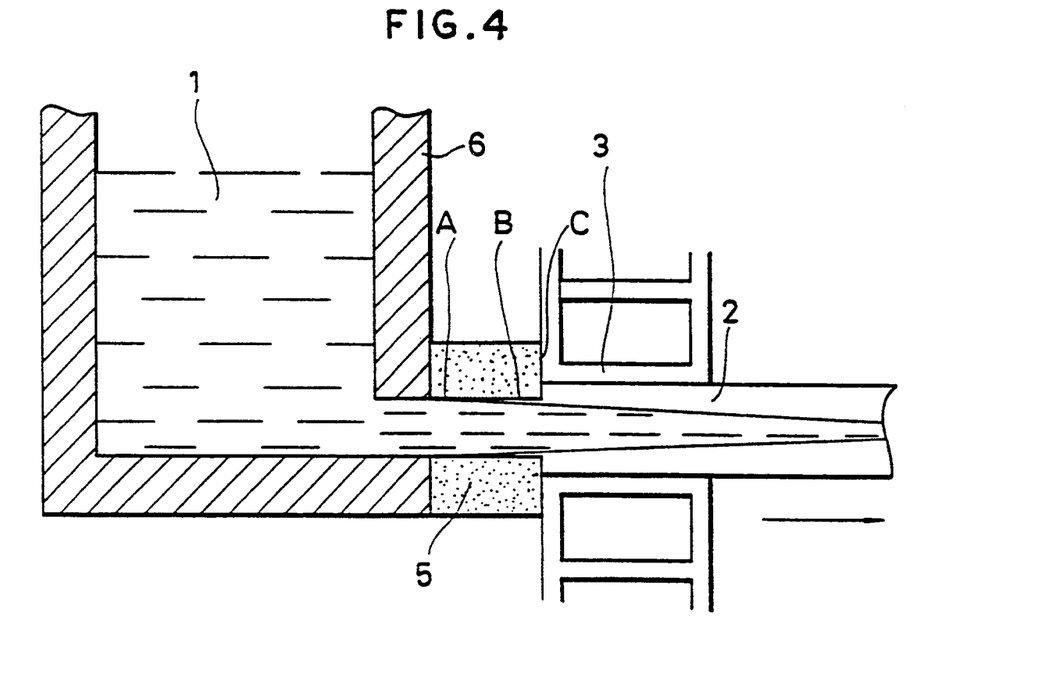

In FIG. 4 is shown a schematic view of a horizontal continuous casting machine, and in the following, description will be made with reference to FIG. 4.

As shown in FIG. 4, a brake ring 5 is a member for connecting a tundish 6 with a water-cooled Cu-mold 3. The machine is designed in such manner than hot melt 1 within the tundish may have its heat taken away in the water-cooled Cu-mold 3 and solidification may commence from the brake ring 5 (location B in this figure). Accordingly, the brake ring 5 is held in contact with two phases, that is with a hot melt phase at location A in the figure and with its solidified phase at location B in the figure.

Furthermore, the brake ring 5 is held in contact also with the water-cooled Cu-mold 3 at location C in the figure, and a temperature gradient in the brake ring member becomes as large as about 1,500° C. Consequently, the brake ring member necessitates, besides corrosion resistivity, excellent thermal-shock proofness and thermal stress-resistivity.

A solidified body 2 is withdrawn continuously following the shape of the Cu-mold 3 (in the direction of an arrow in the FIGURE) as is thus cast. As a result of casting of steel melt heated and molten at a temperature of about 1,520° C. by employing a sintered body of Samples Nos. 18 and 19 having an inner diameter of 180 mm, an outer diameter of 210 mm and a height 20 mm as a brake ring and steel melt (JIS SUS-304) as the hot melt, the brake ring was good without any crack nor without any deformation. The quality of the cast article was also good.

Preferred Embodiment 7.

After BN, AlN, $Al_2O_3$ and $Si_2O_2$ were mixed by predetermined amounts indicated in Table 4 as starting material so that 70% or more of h-BN may be present in a sintered body and complex compound composition as residual components may become $Si_6Al_2O_{13}$ and the mixture was molded into a crucible shape by means of a rubber press, the molded body was sintered at an ordinary pressure at 1,500° C.–1,800° C. within $N_2$ atmosphere, and then it was machined into a crucible of 10 mmΦ in inner diameter and about 5 mm in thickness.

The sinter phase was investigated through X-ray diffraction, and resistance to loss by dissolving was investigated like the preferred embodiment 4. The result are indicated in Table 4.

In Samples Nos. 20 and 21, components $Al_2O_3$ and $SiO_2$ reacted with each other during sintering and resulted in an $Si_6Al_2O_{13}$ phase. In Sample No. 22 oxygen in the BN component and AlN reacted with each other during sintering and resulted in $Al_2O_3$, and further, $Al_6O_3$ and $SiO_2$ reacted with each other and resulted in $Si_6Al_2O_{13}$. As described above, in every sample, sinter composition component other than h-BN component was $Si_6Al_2O_{13}$. As described above, in every sample, sinter composition component other than h-BN component other than h-BN component presented $Si_6Al_2O_{13}$, and the results were excellent also in resistance to loss by dissolving. In Table 4, mechanical strength values are also shown. While only Sample No. 20 presented a low mechanical strength, the other samples showed no problem with respect to the mechanical strength values.

As to the results, in every case, the protective tube 8 was not damaged, and the temperature of steel melt could be measured continuously.

TABLE 4

| | Starting Material Composition (%), Sinter Phase and State of Dissolving-loss | | | | | |
|---|---|---|---|---|---|---|
| No | BN Component % | Other Components | % | Sinter Complex Compound Components | State of Dissolving-Loss | Mechanical Strength $Kgf/mm^2$ |
| 20 | 70 <0> | $Al_2O_3$ $SiO_2$ | 10 20 | $Si_6Al_2O_{13}$ | ◯ | 2≧ |
| 21 | 70 <5> | $Al_2O_3$ $SiO_2$ | 10 20 | $Si_6Al_2O_{13}$ | ◉ | 4–5 |
| 22 | 70 <8> | AlN $SiO_2$ | 8 22 | $Si_6Al_2O_{13}$ | ◉ | 5–6 |
| 23 | 95 <5> | $Si_6Al_2O_{13}$ | 5 | $Si_6Al_2O_{13}$ | ◉ | 4–5 |

< > value is average amount of water insoluble oxygen (%) in BN component based on ordinary temperature three-point bending tests

Preferred Embodiment 8.

Like Preferred Embodiment 4, samples having the composition of Samples Nos. 15–19 were prepared in a crucible shape, and resistance to loss by dissolving against the metals of pure Ni and Fe-50%Ni was investigated under the condition of being held for 1 hr. at 1,500° C. within Ar atmosphere. As a result, it was proved that either sample was excellent in dissolving-loss proofness.

Preferred Embodiment 9.

Figure 5:
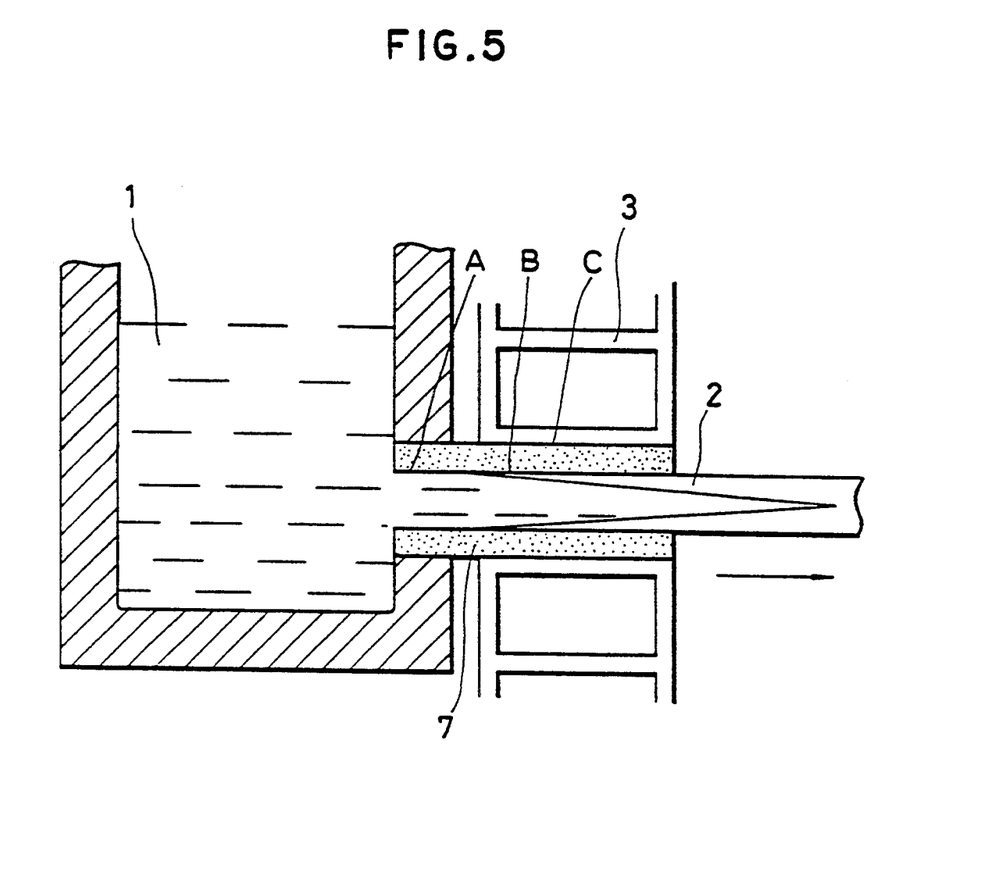

A sample with the composition of sample No. 17 in Preferred Embodiment 4 was as a ceramic mold. A schematic view of the ceramic mold is shown in FIG. 5, and in the following, description will be made with reference to FIG. 5.

The basic structure is identical to the horizontal continuous casting machine disclosed in Preferred Embodiment 6. Differences between a ceramic mold 7 and the brake ring 5 exist in their configurations. The ceramic mold 7 has a configuration covering the entire inner surface of a water-cooled Cu-mold 3, and it achieves also the role of a mold of determining a shape of a solidified body 2.

The ceramic mold 7 is also held in contact with hot melt 1 at location A in the figure and with the solidified body at location B in the figure. In addition, it is also held in contact with the water-cooled Cu-mold at location C in the figure, and so, as a mold material, similar properties as those of the brake ring are necessitated.

When a sintered body with the composition of Sample No. 17 having an inner diameter of 20 mm, an outer diameter of 36 mm and a length of 160 mm was used as the ceramic mold 7, Fe-50%Ni was employed as hot melt, and casting was effected at a temperature of about 1,500° C., casting could be done without generating any crack in the ceramic mold.

Preferred Embodiment 10.

Figure 6:
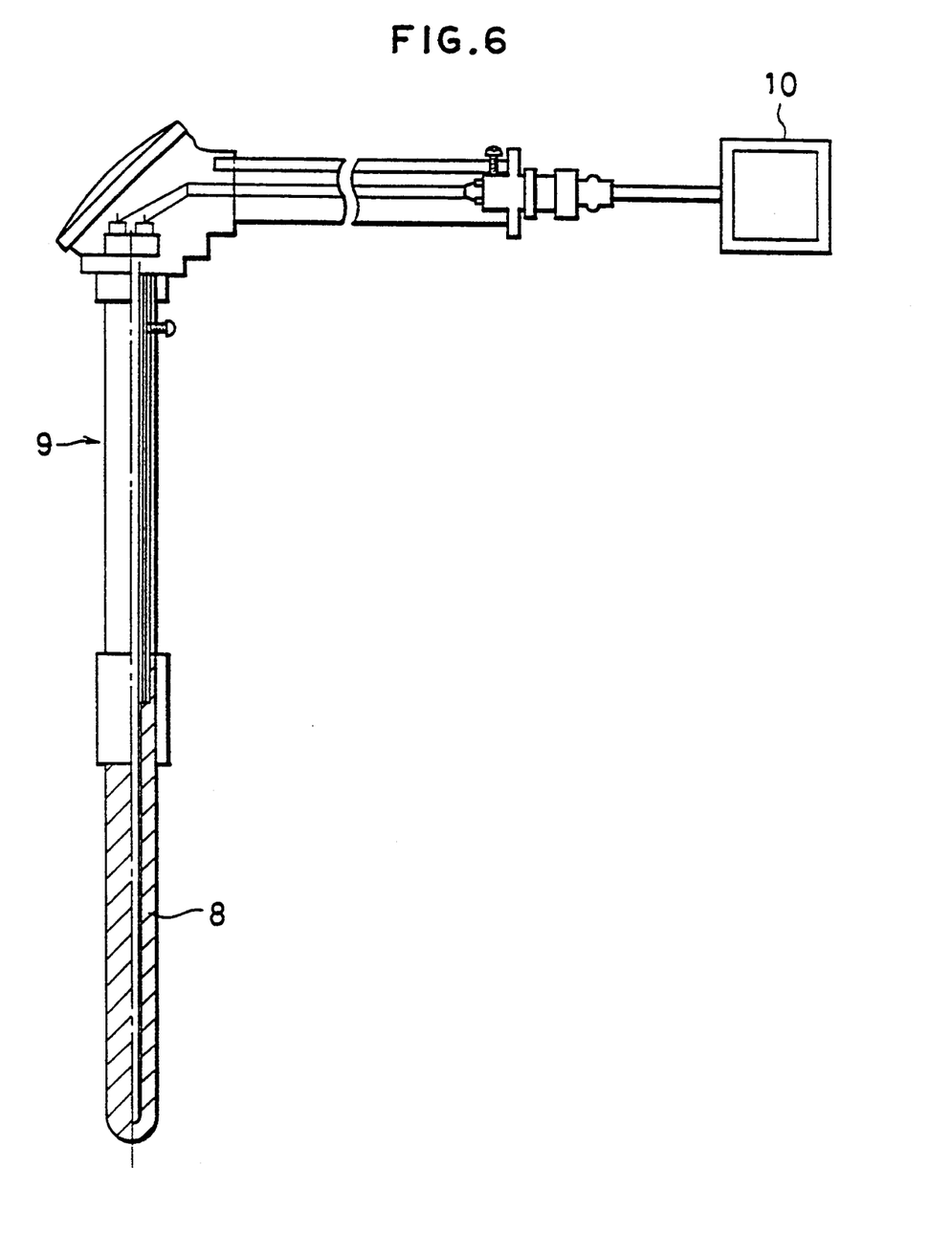

A protective tube was made with the composition of Samples Nos. 15–19 in Preferred Embodiment 4. It was directly dipped from an upper surface of a steel melt level, and a steel melt temperature within a tundish was measured. A temperature measuring instrument used at that time is shown in FIG. 6. In FIG. 6. a hatched portion 8 is the protective tube made with the composition of Samples Nos. 15–19, and reference numeral 10 designates a recorder.

Industrial Availability:

The BN-group ceramics according to the present invention is excellent in resistance to loss by dissolving against hot melt, they can be produced less expensively through no-pressure sintering, and they can by utilized for a brake ring, a ceramic mold, a hot melt temperature measuring protective tube or the like in a continuous casting machine.

We claim:

1. A sintered body shaped to provide contact of said sintered body with a partly solidified phase of a hot melt, said sintered body comprising 50% by weight or more of h-BN and from 1% to less than 50% by weight of a complex compound selected from the group consisting of $Al_6Si_2O_{13}$, $Si_3Al_3O_3N_5$, $Al_3O_3N$ or $Si_6Al_{1-0}O_{21}N_4$.

2. A sintered body as claimed in claim 1 wherein said sintered body is shaped as a withdrawing nozzle for use in shaping of glass.

3. A sintered body as claimed in claim 1 wherein said sintered body is a brake ring for use in connecting a tundish with a water-cooled Cu-mold.

4. A sintered ceramic body, having excellent resistance to dissolution in a hot melt, comprising at least 50% by weight amorphous h-boron nitride, and 1 to less than 50% by weight of a complex compound comprising the elements of at least two compounds selected from the group consisting of AlN, $Si_3N_4$, $Al_2O_3$ and $SiO_2$; said ceramic having been made by sintering, at normal pressure, a mixture of said complex compound and powdered, amorphous h-boron nitride containing an amount of water insoluble oxygen which is effective to increase the strength of said body after sintering.

5. A sintered body as claimed in claim 4, wherein said sintered body is shaped as a crucible.

6. A sintered body as claimed in claim 4, wherein said sintered body is a mold for casting a hot melt.

7. A sintered body as claimed in claim 4 comprising at least about 70 weight percent boron nitride.

8. A sintered body as claimed in claim 4, comprising at least 5 weight percent water insoluble oxygen in the mixture from which said body is sintered.

9. A sintered body as claimed in claim 4 comprising less than 30 weight percent of components other than h-boron nitride.

10. A sintered ceramic body having excellent resistance to dissolution in a hot melt comprising at least 50% by weight amorphous h-boron nitride, 1 to less than 50% by weight of a complex compound comprising the elements of two compounds selected from the group consisting of AlN, $Si_3N_4$, $Al_2O_3$ and $SiO_2$ and less than 30% by weight of one of said compounds other than said complex compound; said ceramic having been made by sintering, at normal pressure, a mixture of said complex compound, and powdered amorphous h-boron nitride, containing an amount of water insoluble oxygen which is effective to increase the strength of said body after sintering.

11. A sintered body as claimed in claim 10 comprising at least about 70 weight percent boron nitride.

12. A sintered body, as claimed in claim 10 comprising at least 5 weight percent water insoluble oxygen in the mixture from which said body is sintered.

13. A sintered body as claimed in claim 10 comprising less than 30 weight percent of components other than h-boron nitride.

14. A sintered body as claimed in claim 4 or 10, wherein said complex compound is selected from $Al_6Si_2O_{13}$, $Si_2Al_3O_7N$, $Si_3Al_{2.67}O_4N_4$, $Si_3Al_3O_3N_5$, $Al_3O_3N$ or $Si_6Al_{10}O_{21}N_4$.

15. A protective tube for a hot melt temperature measuring instrument comprising a sintered body as claimed in claim 4 or 10 wherein said complex compound is selected from $Al_6Si_2O_{13}$, $Si_3Al_3O_3N_5$, $Al_3O_3N$ or $Si_6Al_{10}O_{21}N_4$.

* * * * *